United States Patent
Saidutta et al.

(10) Patent No.: US 11,982,171 B2
(45) Date of Patent: May 14, 2024

(54) ACTIVE REINFORCEMENT LEARNING FOR DRILLING OPTIMIZATION AND AUTOMATION

(71) Applicant: Landmark Graphics Corporation, Houston, TX (US)

(72) Inventors: Yashas Malur Saidutta, Atlanta, GA (US); Raja Vikram R Pandya, Katy, TX (US); Srinath Madasu, Houston, TX (US); Shashi Dande, Spring, TX (US); Keshava Rangarajan, Sugarland, TX (US)

(73) Assignee: Landmark Graphics Corporation, Houston, TX (US)

( * ) Notice: Subject to any disclaimer, the term of this patent is extended or adjusted under 35 U.S.C. 154(b) by 546 days.

(21) Appl. No.: 17/047,109

(22) PCT Filed: Jun. 5, 2020

(86) PCT No.: PCT/US2020/036465
§ 371 (c)(1),
(2) Date: Oct. 13, 2020

(87) PCT Pub. No.: WO2021/040829
PCT Pub. Date: Mar. 4, 2021

(65) Prior Publication Data
US 2023/0116456 A1    Apr. 13, 2023

Related U.S. Application Data

(60) Provisional application No. 62/891,112, filed on Aug. 23, 2019.

(51) Int. Cl.
*E21B 44/00* (2006.01)
*G06N 3/092* (2023.01)

(52) U.S. Cl.
CPC ............. *E21B 44/00* (2013.01); *G06N 3/092* (2023.01); *E21B 2200/20* (2020.05); *E21B 2200/22* (2020.05)

(58) Field of Classification Search
CPC .. E21B 44/00; E21B 2200/20; E21B 2200/22; G06N 3/092
See application file for complete search history.

(56) References Cited

U.S. PATENT DOCUMENTS

2015/0081222 A1    3/2015  Laing et al.
2015/0354336 A1    12/2015 Maurice et al.
(Continued)

FOREIGN PATENT DOCUMENTS

WO    WO-2019040091 A1    2/2019
WO    WO-2020046351 A1    3/2020

OTHER PUBLICATIONS

Korean Intellectual Property Office, International Search Report and Written Opinion, PCT/US2020/036465, dated Sep. 21, 2020, 10 pages, Korea.
(Continued)

*Primary Examiner* — Dany E Akakpo
(74) *Attorney, Agent, or Firm* — Kilpatrick Townsend & Stockton LLP

(57) ABSTRACT

Systems and methods for automated drilling control and optimization are disclosed. Training data, including values of drilling parameters, for a current stage of a drilling operation are acquired. A reinforcement learning model is trained to estimate values of the drilling parameters for a subsequent stage of the drilling operation to be performed, based on the acquired training data and a reward policy mapping inputs and outputs of the model. The subsequent stage of the drilling operation is performed based on the values of the drilling parameters estimated using the trained model. A difference between the estimated and actual values
(Continued)

of the drilling parameters is calculated, based on real-time data acquired during the subsequent stage of the drilling operation. The reinforcement learning model is retrained to refine the reward policy, based on the calculated difference. At least one additional stage of the drilling operation is performed using the retrained model.

20 Claims, 11 Drawing Sheets

(56) References Cited

U.S. PATENT DOCUMENTS

| | | | |
|---|---|---|---|
| 2017/0218728 | A1 | 8/2017 | Dykstra et al. |
| 2018/0025269 | A1 | 1/2018 | Dursun et al. |
| 2018/0135401 | A1* | 5/2018 | Dykstra .................... E21B 7/04 |
| 2020/0308952 | A1* | 10/2020 | Pournazari ........... G05B 13/042 |
| 2020/0370409 | A1* | 11/2020 | Yu .............................. E21B 7/04 |
| 2021/0310307 | A1* | 10/2021 | Panchal .................... G06N 7/01 |

OTHER PUBLICATIONS

James Andrews, Potential Of AI-powered Directional Drilling, A system looks to optimize value in directional drilling by minimizing deviation from planned wellbore trajectory, minimizing tortuosity and more, Jan. 16, 2019, 5 pages, Hartenergy, retrieved Oct. 11, 2020. https://www.hartenergy.com/exclusives/potential-ai-powered-directional-drilling-31723.

Mel Vecerik, Todd Hester, Jonathan Scholz, Fumin Wang, Olivier Pietquin, Bilal Piot, Nicolas Heess, Thomas Rothörl, Thomas Lampe and Martin Riedmiller, Leveraging Demonstrations for Deep Reinforcement Learning on Robotics Problems with Sparse Rewards, Oct. 8, 2018, 10 pages, Arxiv Preprint, 2017.

Charles Blundell, Julien Cornebise, Koray Kavukcuoglu and Daan Wierstra, Weight Uncertainty in Neural Networks, May 21, 2015, 10 pages, Arxiv Preprint, 2015.

Yan Yan, Romer Rosales, Glenn Fung and Jennifer G. Dy, Active Learning from Crowds, 2011, 8 pages, International Conference on Machine Learning.

Yinlam Chow, Ofir Nachum, Edgar Duenez-Guman and Mohammad Ghavamzadeh, A Lyapunov-based Approach to Safe Reinforcement Learning, 2018, 10 pages, $32^{nd}$ Conference on Neural Information Processing Systems, Montréal, Canada.

Jacob Pollock, Zachary Stoecher-Sylvia, Vinod Veedu, Niel Panchal and Hani Elshahawi, Machine Learning for Improved Directional Drilling, Apr. 30-May 3, 2018, 9 pages, OTC-248633-MS, Offshore Technology Conference, Houston, Texas, USA.

Examination Report, GB2200589.6, dated Jan. 11, 2023, 1 page.
Office Action, GB2200589.6, dated Mar. 28, 2023, 1 page.

* cited by examiner

ACTIVE REINFORCEMENT LEARNING FOR DRILLING OPTIMIZATION AND AUTOMATION

CROSS-REFERENCE TO RELATED APPLICATIONS

This application claims priority to U.S. Provisional Application No. 62/891,112, filed on Aug. 23, 2019, the benefit of which is claimed and the disclosure of which is incorporated herein in its entirety.

TECHNICAL FIELD

The present disclosure relates generally to well planning and control during drilling operations and particularly, to real-time modeling and optimization of drilling parameters for well planning and control during drilling operations.

BACKGROUND

To obtain hydrocarbons, such as oil and gas, a wellbore is drilled into a hydrocarbon bearing rock formation by rotating a drill bit attached to a drill string. The drill bit is mounted on the lower end of the drill string as part of a bottomhole assembly (BHA) and is rotated by rotating the drill string at the surface, by actuation of a downhole motor, or both. With weight applied by the drill string, the rotating drill bit engages the formation and forms a borehole toward a target zone. During the drilling process, drilling fluids are circulated to clean the cuttings while the drill bit is penetrated through the formation.

A number of sensors or measurement devices may be placed in close proximity to the drill bit to measure downhole operating parameters associated with the drilling and downhole conditions. The measurements captured by such sensors may be transmitted to a computing device of a drilling operator at the surface of the borehole for purposes of monitoring and controlling the drilling of the wellbore along a planned path over different stages of a drilling operation. Each stage of the operation may correspond to, for example, a predetermined depth interval or length of the wellbore along the planned path. When making decisions for effectively planning and implementing a well plan, the drilling operator may need to constantly monitor and adjust various parameters to account for changes in downhole conditions as the wellbore is drilled through different layers of the formation. However, this may prove to be difficult due to the complexity of the underlying physics and engineering aspects of the drilling process in addition to the inherent uncertainty of the data captured at the surface and downhole.

BRIEF DESCRIPTION OF THE DRAWINGS

The present disclosure is best understood from the following detailed description when read with the accompanying figures.

DETAILED DESCRIPTION

Figure 1:
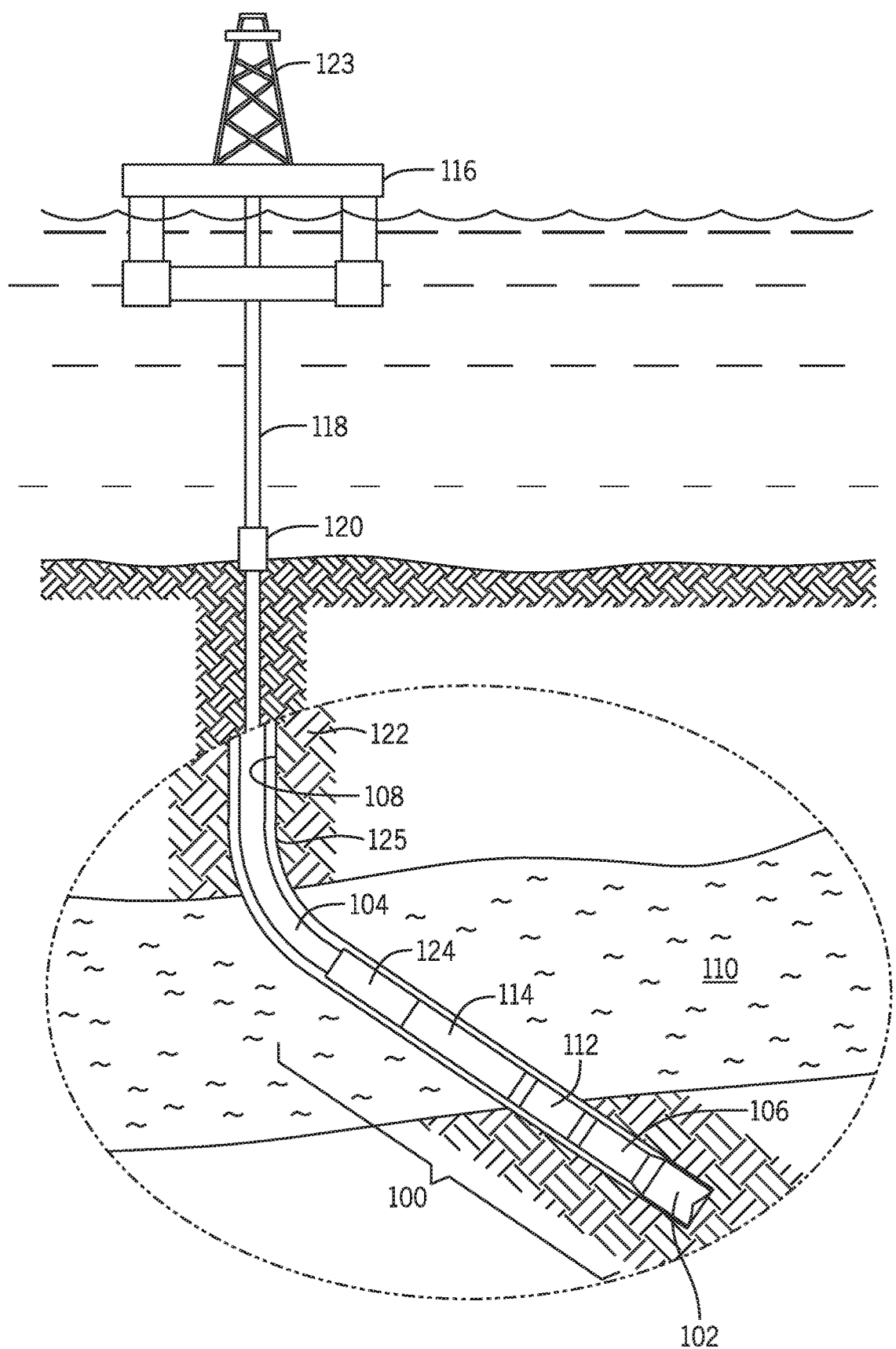
FIG. 1 is a diagram of an illustrative offshore drilling system in accordance with embodiments of the present disclosure.

Embodiments of the present disclosure relate to using active reinforcement learning for automated drilling control and optimization. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein. In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As will be described in further detail below, embodiments of the present disclosure may employ active reinforcement learning to partially or fully automate a drilling operation within a subsurface formation. The drilling operation may involve drilling a wellbore over different stages along a planned path or trajectory through a subsurface formation. In one or more embodiments, a learning component of a drilling control system may be trained to make decisions regarding appropriate actions needed to ensure the wellbore is drilled along the planned path in a safe and reliable manner as downhole conditions change during the operation. For example, the corrective actions performed by a drilling operator to account for such changes during one or more initial stages of the operation may be used in a feedback loop for training the learning component of the system to perform similar actions during later stages. The drilling control system in this example may either provide suggestions for actions that a human operator can choose to perform or automatically perform those actions itself. In this way, the disclosed reinforcement learning techniques leverage human expertise to provide a drilling control system that automatically adapts to the changing drilling environment over each stage of the drilling operation. This in turn reduces the burden on the human drilling operator without compromising the safety or reliability of the wellbore as it is drilled within the formation.

The term "drilling parameters" is used herein to collectively refer to input parameters and output parameters of the drilling operation. An input parameter may by any controllable input or parameter of the drilling operation, which may be adjusted over the course of the operation. Examples of such controllable parameters include, but are not limited to, a rotational speed (e.g., in revolutions per minute or "RPM") of a drill string or drill bit used to drill the wellbore, a weight-on-bit (WOB), a pumping rate of drilling fluid into the wellbore, a drilling direction, and an azimuth and/or inclination of the well path. An output parameter of the operation may be any operating variable or parameter that may change over the course of the operation in response to changes in downhole conditions or changes made to one or more input parameters. In one or more embodiments, the operating parameter may be selected by a drilling operator to monitor a particular output or response of the drilling operation to current operating conditions and values of the input parameters as each stage of the operation is performed along the well path. Examples of such operating parameters include, but are not limited to, hydraulic mechanical specific energy (HMSE) and rate of penetration (ROP).

Illustrative embodiments and related methodologies of the present disclosure are described below in reference to FIGS. 1-9 as they might be employed in, for example, a computer system for automated well planning and control during drilling operations. Such a computer system may be part of a learning component of a drilling control system that uses active reinforcement learning for automated drilling control and optimization, as described above. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram showing an example of an offshore drilling system for a subsea drilling operation. In particular, FIG. 1 shows a bottomhole assembly 100 for a subsea drilling operation, where the bottomhole assembly 100 illustratively comprises a drill bit 102 on the distal end of the drill string 104. Various logging-while-drilling (LWD) and measuring-while-drilling (MWD) tools may also be coupled within the bottomhole assembly 100. The distinction between LWD and MWD is sometimes blurred in the industry, but for purposes of this specification and claims LWD tools measure properties of the surrounding formation (e.g., resistivity, porosity, permeability), and MWD tools measure properties associated with the borehole (e.g., inclination, and direction). In the example system, a logging tool 106 may be coupled just above the drill bit, where the logging tool may read data associated with the borehole 108 (e.g., MWD tool), or the logging tool 106 may read data associated with the surrounding formation (e.g., a LWD tool). In some cases, the bottomhole assembly 100 may comprise a mud motor 112. The mud motor 112 may derive energy from drilling fluid flowing within the drill string 104 and, from the energy extracted, the mud motor 112 may rotate the drill bit 102 (and if present the logging tool 106) separate and apart from rotation imparted to the drill string by surface equipment. Additional logging tools may reside above the mud motor 112 in the drill string, such as illustrative logging tool 114.

The bottomhole assembly 100 is lowered from a drilling platform 116 by way of the drill string 104. The drill string 104 extends through a riser 118 and a well head 120. Drilling equipment supported within and around derrick 123 (illustrative drilling equipment discussed in greater detail with respect to FIG. 2) may rotate the drill string 104, and the rotational motion of the drill string 104 and/or the rotational motion created by the mud motor 112 causes the bit 102 to form the borehole 108 through the formation material 122. The volume defined between the drill string 104 and the borehole 108 is referred to as the annulus 125. The borehole 108 penetrates subterranean zones or reservoirs, such as reservoir 110, believed to contain hydrocarbons in a commercially viable quantity.

The bottomhole assembly 100 may further comprise a communication subsystem including, for example, a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drill string 104, acoustic telemetry through the pipes of the drill string 104, electromagnetic telemetry, optical fibers embedded in the drill string 104, or combinations). Likewise, the telemetry module 124 may receive information from the surface over one or more of the communication channels.

Figure 2:
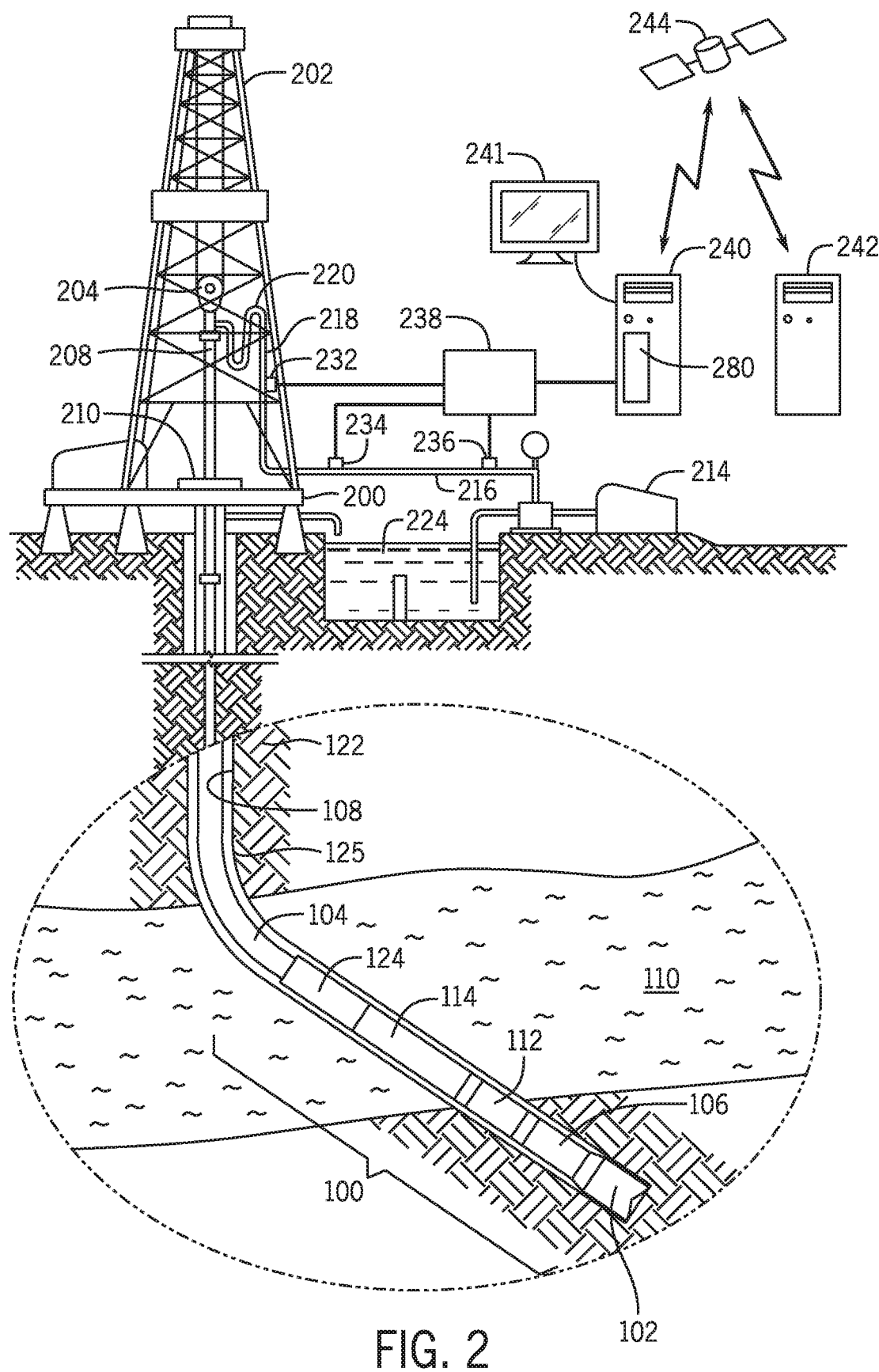
FIG. 2 is a diagram of an illustrative onshore drilling system in accordance with embodiments of the present disclosure.

FIG. 2 is a diagram showing an example of an onshore drilling system for performing a land-based drilling operation. In particular, FIG. 2 shows a drilling platform 200 equipped with a derrick 202 that supports a hoist 204. The hoist 204 suspends a top drive 208, which rotates and lowers the drill string 104 through the wellhead 210. Drilling fluid is pumped by mud pump 214 through flow line 216, stand pipe 218, goose neck 220, top drive 208, and down through the drill string 104 at high pressures and volumes to emerge through nozzles or jets in the drill bit 102. The drilling fluid then travels back up the wellbore via the annulus 125, through a blowout preventer (not specifically shown), and into a mud pit 224 on the surface. At the surface of the wellsite, the drilling fluid is cleaned and then circulated again by mud pump 214. The drilling fluid is used to cool the drill bit 102, to carry cuttings from the base of the borehole to the surface, and to balance the hydrostatic pressure in the rock formations.

In the illustrative case of the telemetry mode 124 encoding data in pressure pulses that propagate to the surface, one or more transducers, e.g., one or more of transducers 232, 234, and 236, convert the pressure signal into electrical signals for a signal digitizer 238 (e.g., an analog-to-digital converter). While only transducers 232, 234, and 236 are illustrated, any number of transducers may be used as desired for a particular implementation. The digitizer 238 supplies a digital form of the pressure signals to a surface computer system 240 or some other form of a data processing device located at the surface of the wellsite. The surface computer system 240 operates in accordance with computer-executable instructions (which may be stored on a computer-readable storage medium) to monitor and control the drilling operation, as will be described in further detail below. Such instructions may be used, for example, to configure the surface computer system 240 to process and decode the downhole signals received from the telemetry mode 124 via digitizer 238.

In one or more embodiments, real-time data collected at the wellsite, including the downhole logging data from the telemetry module 124, may be displayed on a display device 241 coupled to the computer system 240. The representation of the wellsite data may be displayed using any of various display techniques, as will be described in further detail below. In some implementations, the surface computer system 240 may generate a two-dimensional (2D) or three-dimensional (3D) graphical representation of the wellsite data for display on the display device 241 a graphic. The graphical representation of the wellsite data may be displayed with a representation of the planned well path for enabling a user of the computer system 240 to visually monitor or track different stages of the drilling operation along the planned path of the well.

In one or more embodiments, the representations of the wellsite data and planned well path may be displayed within a graphical user interface (GUI) of a geosteering or well engineering application 280 executable at the surface computer system 240. Well engineering application 280 may provide, for example, a set of data analysis and visualization tools for well planning and control. Such tools may allow the user to monitor different stages of the drilling operation and adjust the planned well path as needed, e.g., by manually adjusting one or more controllable parameters via the GUI of well engineering application 280 to control the direction and/or orientation of drill bit 102 and well path. Alternatively, the monitoring and control of the drilling operation may be performed automatically, without any user intervention, by well engineering application 280.

For example, as each stage of the drilling operation is performed, and a corresponding portion of the well is drilled along its planned path, well engineering application 280 may receive indications of downhole operating conditions and values of controllable parameters used to control the drilling of the well during the operation. Examples of such controllable parameters include, but are not limited to, WOB, drilling fluid injection or flow rate and pressure (within the drill pipe), rotational speed of the drill string and/or drill bit (e.g., rotational rate applied by the top drive unit and/or a downhole motor), and the density and viscosity of the drilling fluid. In response to receiving indications of downhole operating conditions during a current stage of the drilling operation, the surface computer system 240 may automatically send control signals to one or more downhole devices (e.g., a downhole geosteering tool) in order to adjust the planned path of the well for subsequent stages of the operation. The control signals may include, for example, optimized values of one or more controllable parameters for performing the subsequent stages of the drilling operation along the adjusted path of the well.

In one or more embodiments, some or all of the calculations and functions associated with the manual or automated monitoring and control of the drilling operation at the wellsite may be performed by a remote computer system 242 located away from the wellsite, e.g., at an operations center of an oilfield services provider. In some implementations, the functions performed by the remote computer system 242 may be based on wellsite data received from the wellsite computer system 240 via a communication network. Such a network may be, for example, a local-area, medium-area, or wide-area network, e.g., the Internet. As illustrated in the example of FIG. 2, the communication between computer system 240 and computer system 242 may be over a satellite 244 link. However, it should be appreciated that embodiments are not limited thereto and that any suitable form of communication may be used as desired for a particular implementation.

While not shown in FIG. 2, the remote computer system 242 may execute a similar application as the well engineering application 280 of system 240 for implementing all or a portion of the above-described wellsite monitoring and control functionality. For example, such functionality may be implemented using only the well engineering application 280 executable at system 240 or using only the well engineering application executable at the remote computer system 242 or using a combination of the well engineering applications executable at the respective computer systems 240 and 242 such that all or portion of the wellsite monitoring and control functionality may be spread amongst the available computer systems.

In one or more embodiments, the wellsite monitoring and control functionality provided by computer system 242. (and computer system 240 or well engineering application 280 thereof) may include real-time analysis and optimization of parameters for different stages of the drilling operation along the planned well path, as described above and as will be described in further detail below with respect to FIGS. 3-15. While the examples of FIGS. 1 and 2 are described in the context of a single well and wellsite, it should be appreciated that embodiments are not intended to be limited thereto and that the real-time analysis and optimization techniques disclosed herein may be applied to multiple wells at various sites throughout a hydrocarbon producing field. For example, the remote computer system 242 of FIG. 2, as described above, may be communicatively coupled via a communication network to corresponding wellsite computer systems similar to the computer system 240 of FIG. 2, as described above. The remote computer system 242 in this example may be used to continuously monitor and control drilling operations at the various wellsites by sending and receiving control signals and wellsite data to and from the respective wellsite computer systems via the network.

Figure 3:
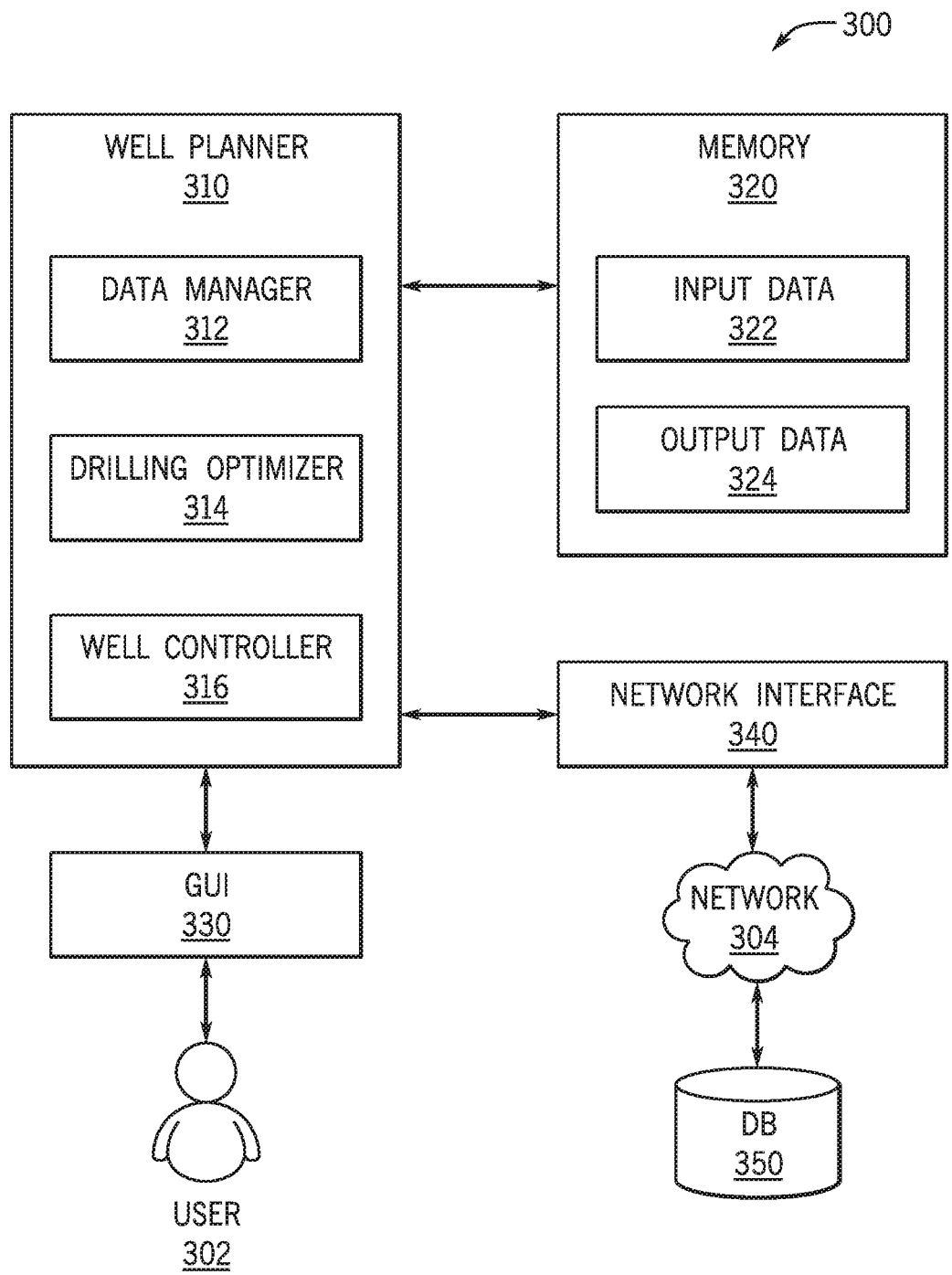
FIG. 3 is a block diagram of an illustrative drilling control system automated drilling control and optimization using active reinforcement learning.

FIG. 3 is a block diagram of an illustrative drilling control system 300 for automated drilling control and optimization using active reinforcement learning. The drilling operation may be, for example, a subsea drilling operation for drilling a wellbore along a planned path through a subsurface formation at an offshore wellsite, as described above with respect to FIG. 1. Alternatively, the drilling operation may be a land-based drilling operation for drilling the wellbore along a planned path through a subsurface formation at an onshore wellsite, as described above with respect to FIG. 2. As shown in FIG. 3, system 300 includes a well planner 310, a memory 320, a graphical user interface (GUI) 330, and a network interface 340. In one or more embodiments, the well planner 310 includes a data manager 312, a drilling optimizer 314, and a well controller 316. Although not shown in FIG. 3, it should be appreciated that system 300 may include additional components and sub-components, which may be used to provide the real-time analysis and optimization functionality described herein.

The network interface 340 of the system 300 may comprise logic encoded in software, hardware, or combination thereof for communicating with a network 304. For example, the network interface 340 may include software supporting one or more communication protocols such that hardware associated with the network interface 340 is operable to communicate signals to other computing systems and devices via the network 304. The network 304 may be used, for example, to facilitate wireless or wireline communications between the system 300 and the other computing systems and devices. In some implementations, the system 300 and the other systems and devices may function as separate components of a distributed computing environment in which the components are communicatively coupled via the network 304. While not shown in FIG. 3, it should be appreciated that such other systems and devices may include other local or remote computers including, for example and without limitation, one or more client systems, servers, or other devices communicatively coupled via the network 304.

The network 304 may be one or any combination of networks including, but not limited to, a local-area, medium-area, or wide-area network, e.g., the Internet. Such network(s) may be all or a portion of an enterprise or secured network. In some instances, a portion of the network 304 may be a virtual private network (VPN) between, for example, system 300 and other computers or other electronic devices. Further, all or a portion of the network 304 can include either a wireline or wireless link. Examples of such wireless links include, but are not limited to, 802.11a/b/g/n, 802.20, WiMax, and/or any other appropriate wireless link. The network 304 may encompass any number of internal (private) or external (public) networks, sub-networks, or combination thereof to facilitate communications between various computing components including the system 300.

In one or more embodiments, data manager 312 of well planner 310 may use the network 304 to communicate with a database 350. The database 350 may be used to store data accessible to the system 300 for implementing the disclosed active reinforcement learning during the drilling operation. The database 350 may be associated with or located at the operations center of an oilfield services provider, as described above with respect to computer system 242 of FIG. 2. In one or more embodiments, database 350 may be an expert database including information regarding different drilling scenarios encountered during prior drilling operations. Such information may include, for example and without limitation, the planned path of the wellbore drilled during a prior drilling operation, the state of the drilling environment at each stage of the operation, the corrective action(s) performed by a human drilling operator or a drilling control system from one stage to the next (e.g., in response to changing downhole conditions), the outcome of such actions (e.g., in terms of the reward obtained or cost incurred as a result of the actions performed). In some cases, this information may be contributed by experts (e.g., drilling operators) of varying levels of expertise and experience, particularly with respect to downhole operations within drilling environments similar to that of the current drilling operation. Additionally, the data contributed by each expert may be weighted according to a rating or score assigned to that expert according to the expert's level of experience or expertise in different drilling operation scenarios. Thus, the expert data that is retrieved for a current drilling operation may include information contributed by an expert having a relatively higher expertise rating or score associated with similar types of drilling operations, e.g., within drilling environments or formations that are similar to those expected for the current drilling operation. As will be described in further detail below, the data stored within database 350 may be applied as training data for training a reinforcement learning model used by a learning component of system 300 to automatically control and optimize the drilling process, e.g., by selecting and/or performing necessary corrective actions without human intervention, according to the type of drilling scenario or environment encountered during a current drilling operation.

In addition to the expert data described above, the reinforcement learning model in this example may be trained using other types of wellsite data including, for example, historical wellsite data and parameters associated with drilling operations at various wellsites, e.g., other wellsites within the same hydrocarbon producing field as the wellsite in this example. The wellsite data may include, but is not limited to, sensor measurements collected in real-time from the wellsite as different stages of the drilling operation are performed along the planned path of the wellbore being drilled. Such real-time data may include current values of controllable parameters of the drilling operation, e.g., flow rate or pumping rate of a drilling fluid, a drilling direction; and an azimuth and inclination of the planned path of the wellbore being drilled, weight on bit (WOB), and drill bit rotational speed (RPM). However, it should be appreciated that this data may also include any of various measurements or other data collected at the wellsite. Examples of such other data include, but are not limited to, depth (vertical depth within the formation and/or measured depth of the wellbore, whether vertical or deviated), bit size, drill collar length, torque and drag on the string, plastic viscosity, yield point, mud weight, gel strength, downhole pressure, and temperature. In some implementations, the real-time data may be retrieved over network 304 from a surface computer system (e.g., computer system 240 of FIG. 2, as described above) located at the wellsite. For example, the data may be streamed from as a real-time data feed directly from the wellsite to a designated buffer or storage area within memory 320.

In one or more embodiments, the wellsite data along with the information retrieved from the expert database (e.g., database 350) may be stored within memory 320 as input data 322. It should be appreciated that the retrieved data may be transmitted and stored using any type of data format, standard, or structure, as desired for a particular implementation. An example of such a data format is the wellsite information transfer standard markup language (WITSML) commonly used in the oil and gas industry.

In one or more embodiments, data manager 312 may preprocess the stored input data 322 or real-time data feed received via network 304 from the wellsite computer system. The preprocessing may include, for example, filtering the data into a predetermined sampling rate or drilling rate time series. In some implementations, data manager 312 may include one or more data filters for reducing or canceling noise from the real-time data. Examples of such filters include, but are not limited to, a convolution neural network, a band-pass filter, a Kalman filter, a high pass filter, a low pass filter, an average filter, a noise reduction filter, a delay filter, a summation filter, a format conversion filter, and any other type of digital or analog data filters. The preprocessed data may then be classified for use in prediction and optimization of one or more operating variables and controllable parameters for different stages of the drilling operation, as will be described in further detail below.

In one or more embodiments, at least one output parameter of the drilling operation, e.g., at least one of ROP or HMSE, may be selected by a user 302 via the GUI 330 for monitoring the progress of the operation as the wellbore is drilled within the formation. As described above, the output parameter may be affected by the downhole environment and values of the input parameters during each stage of the operation. Accordingly, the output parameter selected by user 302 may be used to monitor drilling efficiency and trends in the performance of the drilling operation as the wellbore is drilled through the formation. In one or more embodiments, a visualization of estimated values of the operating variable and/or controllable parameters affecting the operating variable may be presented to the user 302 via a visualization window or content viewing area of the GUI 330. The GUI 330 may be displayed using any type of display device (not shown) coupled to system 300. Such a display device may be, for example and without limitation, a cathode ray tubes (CRT), liquid crystal displays (LCD), or light emitting diode (LED) monitor. The user 302 may interact with the GUI 330 using an input device (not shown) coupled to the system 300. The user input device may be, for example and without limitation, a mouse, a QWERTY or T9 keyboard, a touch-screen, a stylus or other pointer device, a graphics tablet, or a microphone. In some implementations, user 302 may use the information displayed via the GUI 330 to assess drilling performance at each stage of the operation and make any manual adjustments to the planned path of the well, e.g., by entering appropriate commands that well controller 316 can use to control the drilling process, e.g., direction, azimuth, and inclination of the well path within the formation. However, it should be appreciated that such adjustments may be made automatically by well controller 316, as will be described in further detail below.

In one or more embodiments, data manager 312 may retrieve and apply input data 322 as training data to an active reinforcement learning model of drilling optimizer 314. Such training data may include values of drilling parameters for a current stage of a drilling operation being performed within the subsurface formation. The active reinforcement learning model may be a neural network, e.g., a deep or deep-learning neural network. The neural network may include different layers and nodes mapping inputs (e.g., the planned well path and the current state of the environment) and outputs of the model. The outputs of the model may include, for example, optimal values of controllable parameters and/or actions that may be performed to account for downhole operating conditions, as described above. The outputs of the model may be stored in memory 320 as output data 324.

In one or more embodiments, the mapping of model inputs and outputs may be based on a reward policy associated with the model. The reward policy may be defined by an objective function defining a response value of at least one operating variable to be optimized during the drilling operation along the planned path, based on current values of the input parameters of the drilling operation. The reward policy may be adjusted or refined during the drilling operation using on-policy reinforcement learning algorithms. Such on-policy algorithms may attempt to improve a certain reward policy based exclusively on those actions taken by the system while executing that very policy. Additionally, off-policy algorithms may be used to refine the reward policy of the model based on the expert data acquired from database 350 relating to the experiences of expert drilling operators from prior drilling operations.

In one or more embodiments, drilling optimizer 314 may train the reinforcement learning model to estimate values of the drilling parameters for a subsequent stage of the drilling operation to be performed, based on the training data acquired by data manager 312, e.g., as stored in memory 320 as input data 322.

Well controller 316 may perform a subsequent stage of the drilling operation based on the values of the drilling parameters estimated using the reinforcement learning model as trained by drilling optimizer 314.

In one or more embodiments, drilling optimizer 314 may calculate a difference between the estimated and actual values of the drilling parameters, based on additional real-time data acquired by data manager 312 as the subsequent stage of the drilling operation is performed within the subsurface formation and the reward policy of the reinforcement learning model. The calculated difference may be used to retrain the reinforcement learning model. The retraining may include refining the reward policy associated with the reinforcement learning model for at least one additional stage of the drilling operation to be performed. Well controller 316 may then perform the additional stage of the drilling operation using the retrained reinforcement learning model.

Figure 4:
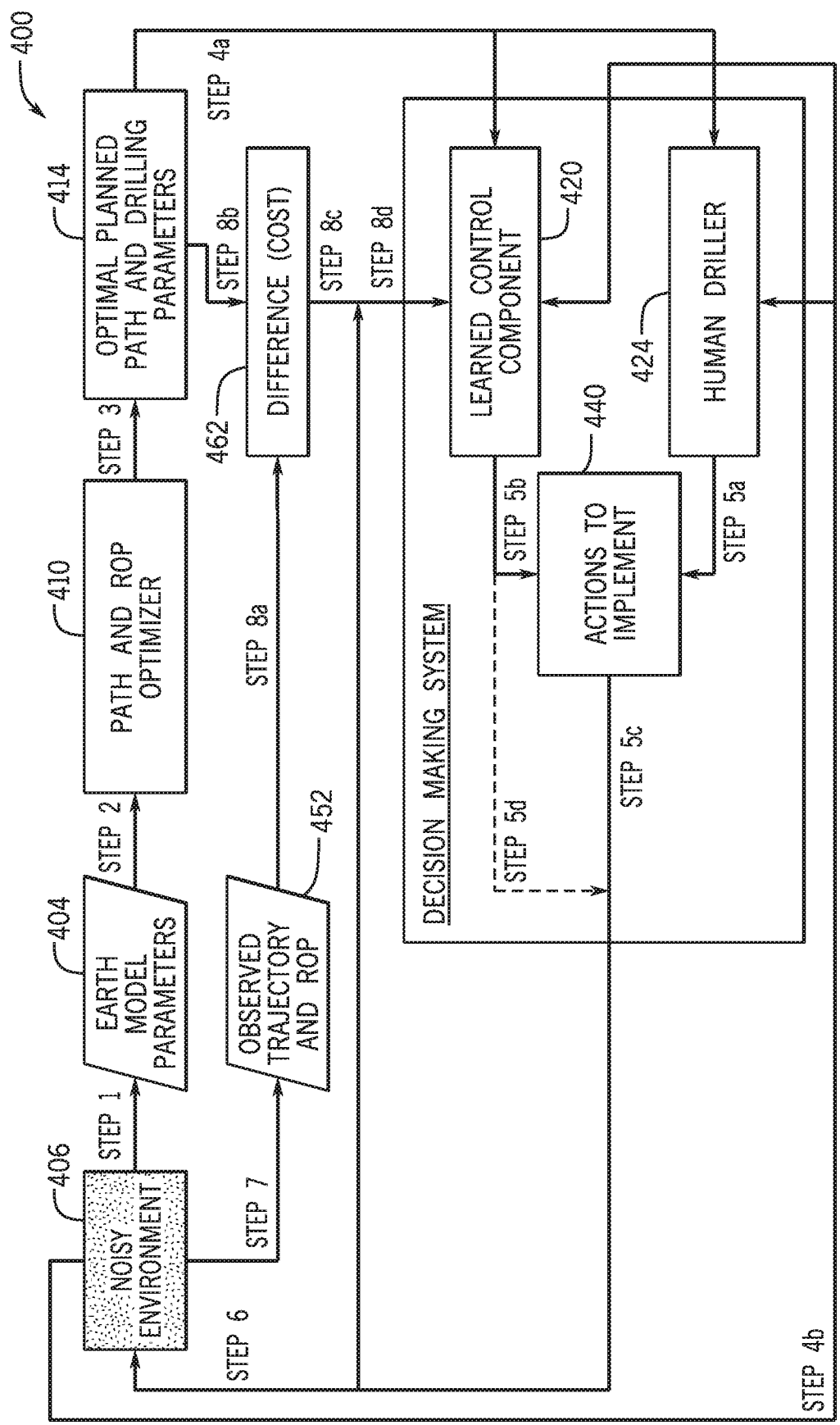
FIG. 4 is a flow diagram of an illustrative process for well planning and control using active reinforcement learning during a drilling operation.

FIG. 4 is a flow diagram of an illustrative process 400 for well planning and control using active reinforcement learning during a drilling operation. In Step 1, the drilling control system, e.g., system 300 of FIG. 3, as described above, acquires formation model parameters 404 (or "earth model parameters" in FIG. 4), e.g., parameters for a geophysical model of the subsurface formation in which a current stage of the drilling operation is being performed. In some embodiments, the formation model parameters 404 may be acquired from the drilling environment 406 (or "noisy environment" in FIG. 4) in which the current stage of the drilling operation is being performed. In Step 2, the acquired formation model parameters 404 are input into a path and rate of penetration (ROP) optimizer 410 (or "PATH and ROP optimizer" in FIG. 4), which estimates, in Step 3, an optimal well path and associated drilling parameters 414 (e.g., RPM, WOB, etc.) needed to drill the wellbore along that path during a subsequent stage of the operation. The optimal drilling parameters 414 may include an output parameter of the drilling operation (e.g., RPM, WOB, etc.) that achieves a desired ROP. The optimal drilling parameters 414 may include an output parameter of the drilling operation, e.g., RPM of the drill bit or the WOB on the drill bit, etc., used to drill the wellbore during each stage of the drilling operation. The PATH and ROP optimizer 410 could be implemented in a learning component 420 of the drilling control system (or "learned control component" in FIG. 4) using well-known or proprietary path planning tools.

Process 400 then proceeds to Step 4, which includes providing the estimated well path and drilling parameters 414 (Step 4a) along with the observed state of the drilling environment 406 (Step 4b) to a human drilling operator 424 and the learning component 420. The drilling environment 406 may be considered "noisy" as its observed state may be based on downhole data that includes a certain amount of noise due to characteristics of the formation in which it was acquired, e.g., using downhole sensors coupled to the drill string disposed within the wellbore. The noise may also be used to model the measurement uncertainty associated with the sensory information. This state information may or may not be preprocessed (e.g., using data manager 312 of FIG. 3, as described above) before being used for model training purposes by the system.

Step 5 may include at least three sub-steps: Step 5a, in which the human driller 424 determines a set of actions 440 to perform (or "actions to implement" in FIG. 4) based on the planned drilling path and the planned optimal drilling parameters 414; Step 5b, in which the learning component 420 makes a similar determination and suggests the actions 440 to perform based on the same inputs provided to the human driller 424; and Step 5c, in which the human driller 424 compares the actions 440 suggested by the learning component 420 and decides which action to implement. In some implementations, Step 5 may include an optional Step 5d, in which the system may be placed in autonomous mode and the human driller 424 may allow the system to implement its actions (e.g., the actions 440 suggested by the learning component 420) without any intervention. In some cases, the human driller 424 may have the option to modify certain actions 440 of the system before they are performed in the field.

In Step 6, the selected actions 440 are performed by the human drilling operator 424 or autonomously by the drilling control system based on real-time data acquired from the noisy drilling environment 406. In some implementations, the actions 440 may be performed by the system only after being vetted by the drilling operator 424.

Step 7 includes determining the actual or observed trajectory of the wellbore and ROP 452 based on the drill bit's response to the actions performed 440 and the constraints of the drilling environment 406, The observed response or output data 452 may include a new position of the drill bit and the ROP observed during the relevant time frame.

Step 8 includes accessing the actual observed trajectory and the observed ROP 452 (Step 8a), accessing the planned trajectory and the planned ROP 414 (Step 8b), calculating a difference 462 between the observed 452 and the planned 414 output parameters, referred to herein as a "cost" of the actions performed (Step 8c), and concatenating the cost 462 with the planned action to serve as feedback to the learning component 420 of the drilling control system (Step 8d). The cost 462 may be one or combination(s) of the metrics used to gauge and improve the performance of the learned control component 420 in terms of the amount of deviation between the actual/observed 452 and estimated 414 drilling response.

The feedback used to train the system may be represented as a tuple or set of variables for the drilling operation including, but not limited to, a Current State (x), at least one Action (a), a Cost or Reward (r), and a Next State (x'). This feedback allows the drilling control system to use active reinforcement learning to learn from experience, from one drilling state to the next. The training of the reinforcement learning model or learning component of the system (and data used for such training) during a drilling operation may be referred to as "online" training (using online training data). In one or more embodiments, the learning model/component may be trained before the drilling operation using an "offline" training process with offline training data, as will be described in further detail below. The offline training may include one or more of historical data, expert recommendations, and simulation results. The offline-trained model/component may then be fine-tuned for the particular well using online training data, e.g., real-time sensor measurements acquired during the drilling operation.

Figure 5:
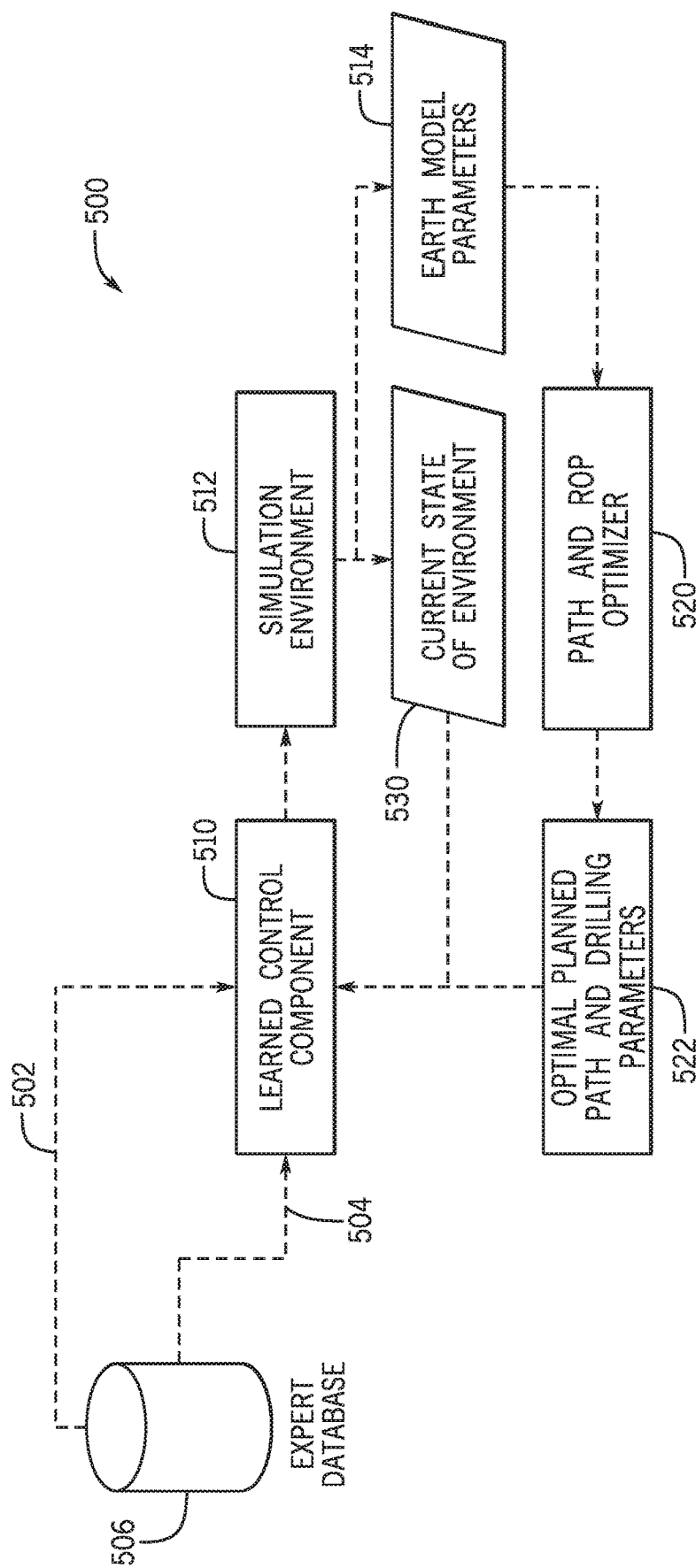
FIG. 5 is a flow diagram of an illustrative process for training a reinforcement learning model for automated drilling control and optimization using "offline" training data prior to a drilling operation.

FIG. 5 is a flow diagram of an illustrative process 500 for training a reinforcement learning model for automated drilling control and optimization using offline training data prior to a drilling operation. Process 500 may be used to implement an initial training phase for adapting the model to the particular wellbore or formation in which the drilling operation will be performed, or the process 500 may be used to train the model to avoid online learning from scratch. The offline data used to train the model may include historical wellsite data 502 and expert data 504 from previous drilling operations as acquired from an expert database 506, e.g., database 350 of FIG. 3, as described above. The offline data can also include data from a simulation software where one or more human drillers have drilled in a simulated environment. The expert data 504 may include information regarding various factors affecting the drilling operation including, for example, the planned path, current state of the drilling environment, action(s) performed, next state of the environment, and reward/cost obtained as a result.

As shown in FIG. 5, the historical wellsite data 502 and expert data 504 may be provided to a learning component 510 (or "learned control component" of FIG. 5), which may provide the data to a simulation environment 512. Using the historical wellsite data 502 and/or expert data 504, the simulation environment 512 may determine one or more formation model parameters (or "earth model parameters") 514. The formation model may be, for example, a geophysical model of the subsurface formation of a prospective or current wellsite. The formation model parameters 514 are input into a "PATH and ROP Optimizer" 520, similar to process 400 of FIG. 4, described above. For instance, the PATH and ROP Optimizer 520 may estimate an optimal well path and associated drilling parameters 522 needed to drill the wellbore along the path. The optimal well path and associated drilling parameters 522 may then be fed back into the learning component 510. In some embodiments, the drilling parameters 522 may represent a current state of a drilling environment 530, e.g., drilling environment 406 of FIG. 4, as described above, which may be fed into the learning component 510. The current state of the drilling environment 530 may be determined from current parameters acquired from one or more sensors within a wellbore and/or from the historical wellsite data 502. The learning component 510 may then compare the current state of the drilling environment 530 with the determined optimal well path and drilling parameters 522 determined through simulation to train the reinforcement learning model. In some embodiments, the process 500 may be repeated multiple times to further refine and train the reinforcement learning model.

Learning from expert demonstrations may be performed by off-policy based actor-critic Reinforcement Learning algorithms, e.g., based on a deep deterministic policy gradient from expert demonstrations. This may initially involve defining a reward policy for the reinforcement learning model. Such a policy may be a function that maps the input of the learning model (e.g., the planned path and/or the current state of the environment) and outputs the action to take.

In one or more embodiments, the initial policy of the learning model may be adjusted or refined during the drilling operation during online training with on-policy reinforcement learning algorithms. Such on-policy algorithms may be used to improve a certain reward policy based exclusively on those actions taken by the system while executing that very policy, as will be described in further detail below.

In one or more embodiments, Bayesian optimization may be used to retrain the model using active reinforcement learning. For example, the model may be a neural network, which can be retrained (and the policy fine-tuned) by applying Bayesian optimization to the parameters of the neural network. Examples of such parameters include, but are not limited to, the number of layers of the neural network, the number of nodes in each layer, the learning rate of decay and any other parameter that relates to the behavior and/or capacity of the model. Also, instead of using a standard Neural Network a Bayesian Neural Network might be used. Such a Bayesian neural network may be able to handle uncertainty in the model's inputs and provide uncertainty estimates for its outputs. If the output uncertainty is too high, e.g., above a maximum threshold, the system may request feedback from the human drilling operator or transfer control to the human operator, e.g., switch from autonomous mode to a manual drilling mode. Seeking feedback from the human drilling operator may allow the system to use active learning to handle such uncertainty and learn from the expertise of the human drillers without having to switch entirely to a manual mode of operation.

The process of using this type of active learning during a drilling scenario may be expressed at a high-level as follows:
for a current state "x" of a drilling environment, environment samples "$x_i$" may represent points along a well path at which human driller feedback was obtained. The samples "$x_i$" need not be points along the current well and may be points along a neighboring well or some well that shows geological similarity to the current well;
find the closest "$x_k$" to the current state x among the samples $x_i$, where the closeness may be defined using a neural network or some other distance measure; and
request feedback from the human driller(s) known to be the most experienced or have the greatest expertise in drilling operations within similar types of drilling environments (where similarity has been defined above) or formations as in the current scenario, e.g., based on the expertise rating or score associated with each driller in the expert database relative to the ratings of other experts/drillers, as described above.

Examples of various drilling scenarios in which similar active reinforcement learning techniques may be used will be described in further detail below with respect to FIGS. 6-7C.

Figure 6:
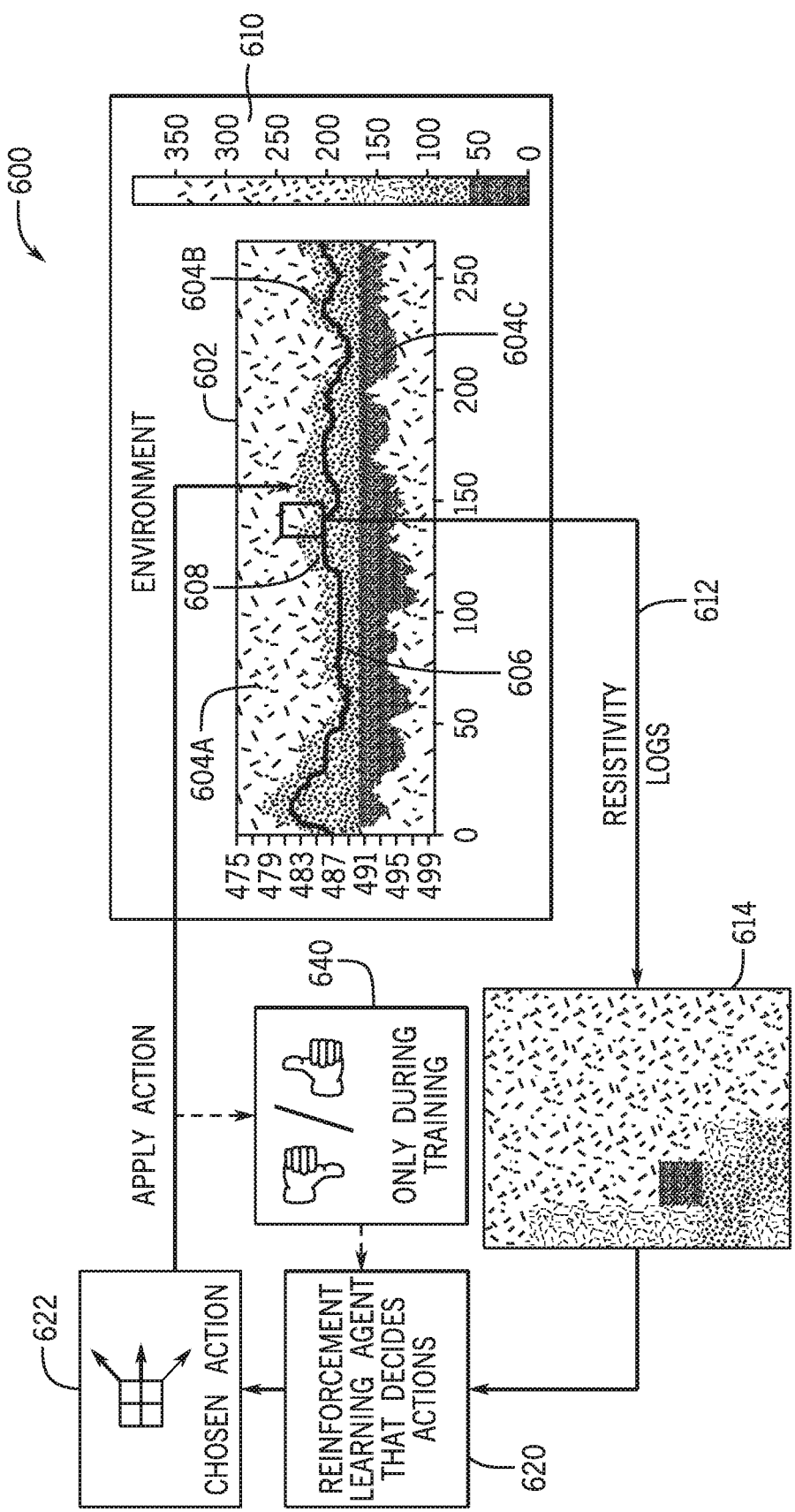
FIG. 6 is a diagram of a flow diagram of an illustrative process for training a reinforcement learning model using "online" training data acquired during a drilling operation.

FIG. 6 is a flow diagram of an illustrative process 600 for training a reinforcement learning model using real-time or "online" training data during a drilling operation. The online training in process 600 may involve using similar reinforcement learning algorithms as those described above for offline training. However, instead of using expert data or simulation results from a simulated or virtual drilling environment, online training may involve using real-time data and feedback from a human operator, including actions performed by the operator in response to conditions encountered in the actual drilling environment. The drilling operation or scenario in this example may involve drilling a wellbore within a layered drilling environment as represented by a chart 602 shown in FIG. 6, where the different areas of the chart 602 correspond to different layers of the drilling environment. The different layers of the drilling environment may be distinguished by pixel, color, and/or shading, among others, within the chart 602, such as explained below. For discussion purposes, it is assumed that the wellbore is being drilled along a horizontal or deviated path through this layered environment.

Each layer of the drilling environment may correspond to a layer of a subsurface formation with different rock properties and formation characteristics than other layers. For example, a first shaded area 604A may represent a first subsurface layer of the formation, such as a layer of shale in an upper portion of the formation. A second shaded area 604B may represent a second subsurface layer of the formation, such as the oil reservoir. A third shaded area 604C may represent a third subsurface layer of the formation, such as a layer of water at the bottom of the reservoir. A target zone 608 may be defined as the reservoir region above a line 606. The line 606 may be the lower border of the target zone 608. This is only used for illustration purposes and is unknown when actually drilling the well. The various layers of the subsurface formation may be represented or distinguished by pixel, color, and/or shading gradations, such as the shading gradations shown in FIG. 6. The gradations may represent or correspond to different resistivities, measured in ohm-meters, as defined by the legend 610 next to the chart 602.

The resistivities in this example may be based on resistivity log readings 612 collected by a downhole logging tool coupled to the drill string (e.g., at or near the drill bit attached to the drill string) for areas of the formation surrounding the drill bit's current position within the wellbore. The resistivity values themselves may not be exact and instead, may be based on a sensing model of the formation. In one or more embodiments, each area of the formation in which the logging tool collects resistivity log readings 612 may be represented as a block of grid points 614 of a particular size (e.g., a block of 7 grid points by 6 grid points) within a corresponding area of the model. Each grid block 614 may correspond to, for example, a one square meter area of the formation. As shown in FIG. 6, the observed resistivity logs may be used by the learning agent or component 620 of the drilling system to select an action 622 to be applied or performed by the drilling system for controlling the direction of drilling, e.g., by steering the drill bit in various directions, including upwards, downwards, laterally, diagonally or any combination thereof for drilling within a three-dimensional environment. The drill bit may proceed accordingly for a certain distance (e.g., one meter) and the logging and drilling control process described above may be repeated multiple times as the wellbore is drilled.

In some embodiments, a training subsystem 640 of learning component 620 may be used to evaluate the effects of the applied action 622. For instance, the learning component 620 may evaluate whether the selected action 622 being performed by the drilling system is proceeding as desired, e.g., evaluating whether the drill bit is being steered in a desired direction based on data acquired by one or more sensors located along the drill string within the wellbore. In this way, real-time or "online" training data may be used to make comparisons between the intended versus actual effects of a chosen action on the outcome of the drilling operation in real time and further train the reinforcement learning model to make better decisions as to which actions to take over the course of the drilling operation. Repeated comparisons as the wellbore is drilled may further refine the reinforcement learning model.

Figure 7A:
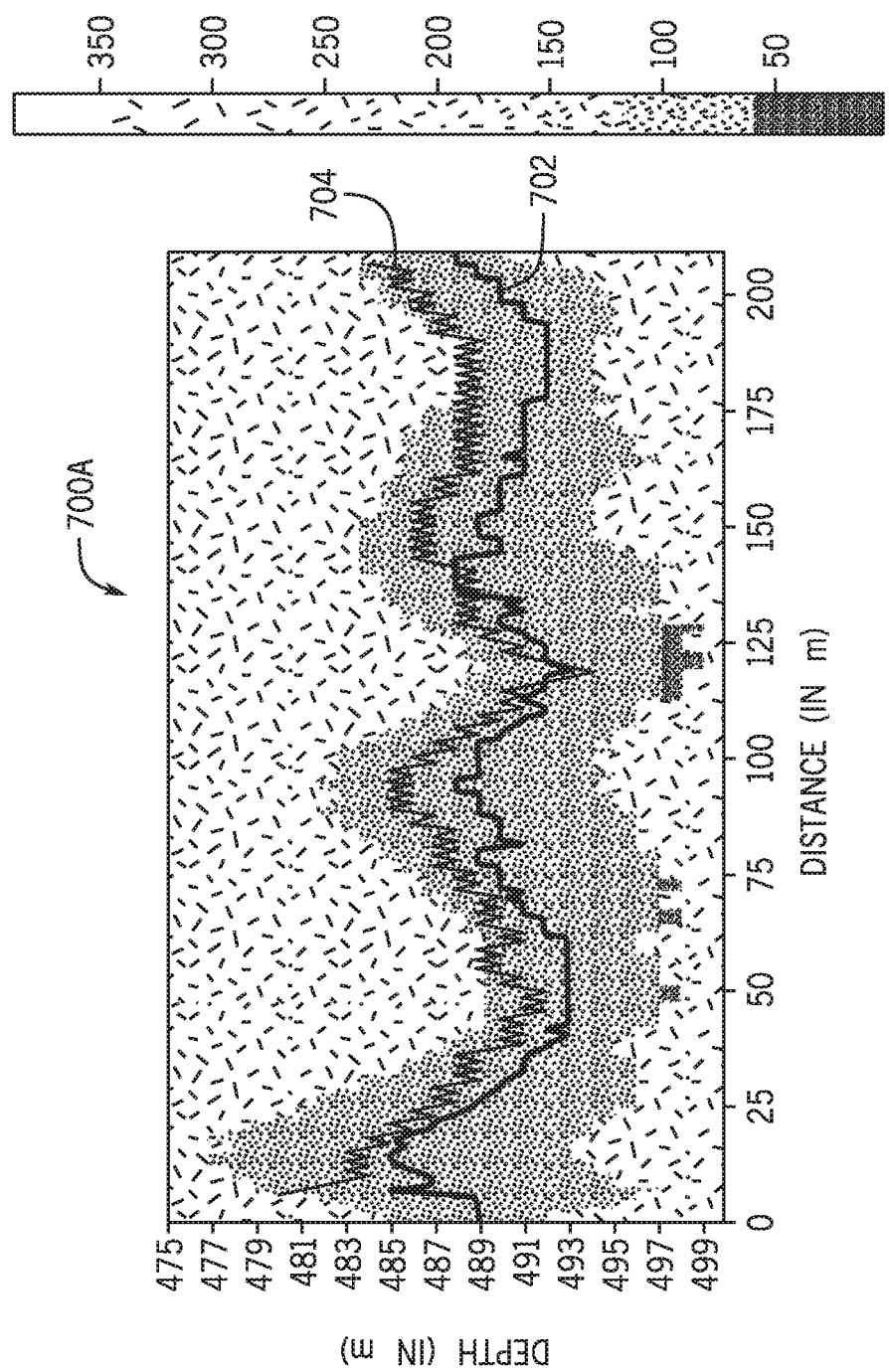
FIGS. 7A, 7B, and 7C are diagrams illustrating different drilling scenarios in which a reinforcement learning model that has been trained using prior data is tested on a new environment.
Figure 7B:
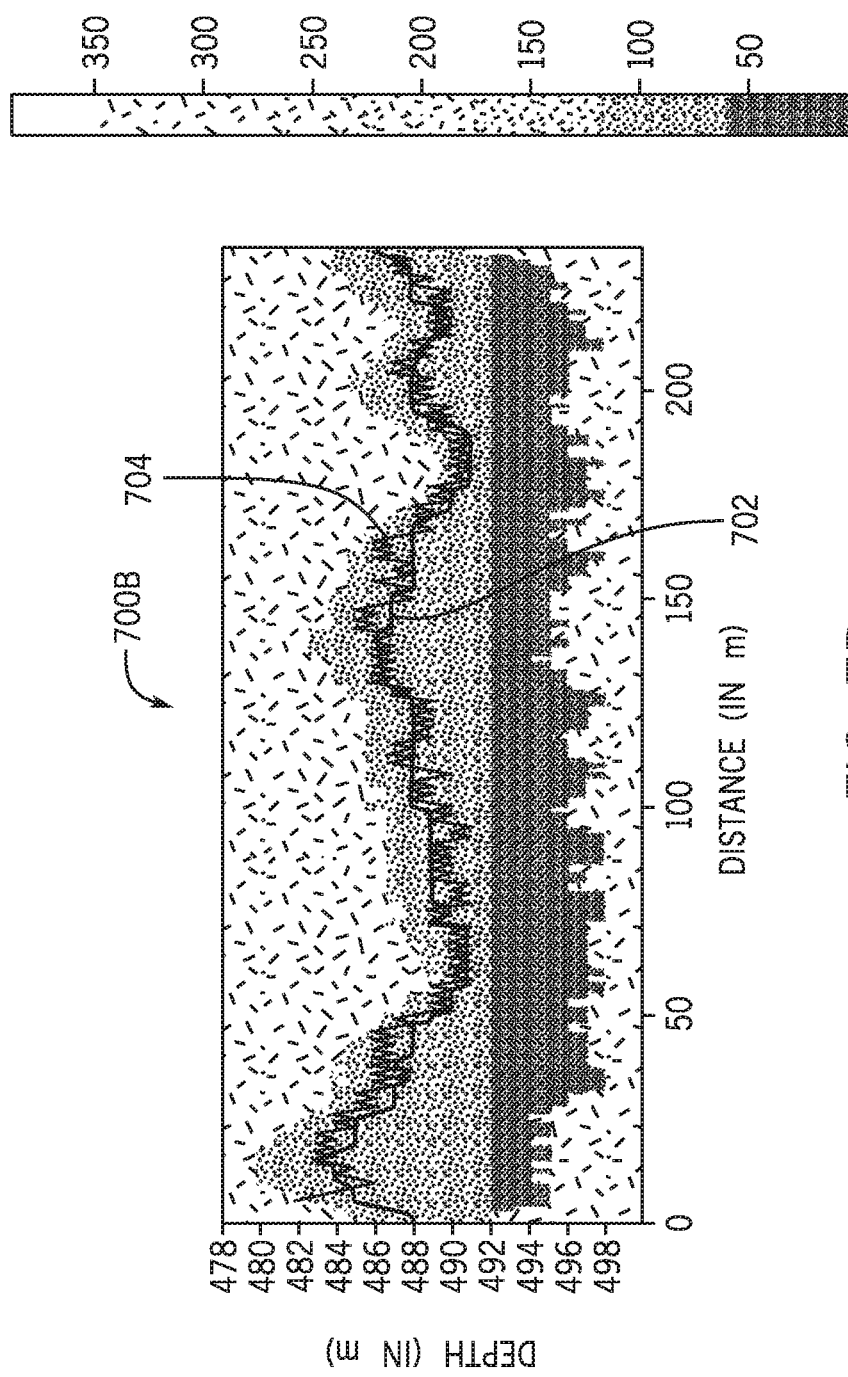
Figure 7C:
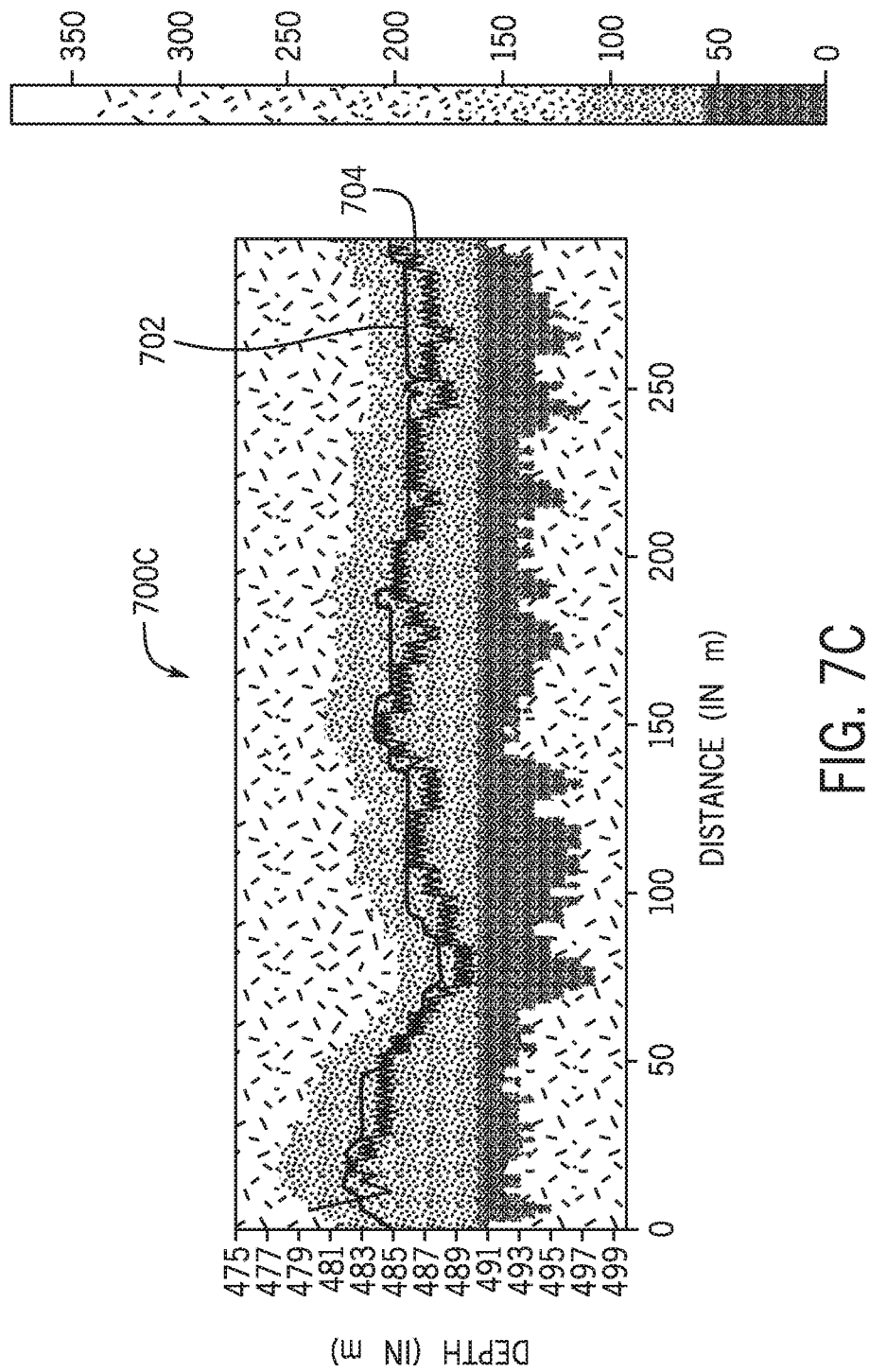

FIGS. 7A, 7B, and 7C are diagrams illustrating different examples of drilling scenarios in which a reinforcement learning model or learning agent/component of a drilling control system may be trained. The training process for each drilling scenario may involve using different types of online training data acquired during the drilling operation, as described above. It is assumed for discussion purposes only that the drilling environment in each of these scenarios is similar to that described above in the example of FIG. 6. Like the drilling environment in FIG. 6, the drilling environment in each of FIGS. 7A, 7B, and 7C is shown as charts 700A, 700B, 700C, respectively, with different areas of each chart representing different formation layers or zones within the environment. A line 702 at the center of the shaded areas of each chart for the drilling environment in each of FIGS. 7A, 7B, and 7C represents the ideal wellbore path if the environment was completely known ahead of time. Line 704 in each of FIGS. 7A, 7B, and 7C represents the drilling path drilled in an autonomous mode (e.g., a complete autonomous mode). The autonomous system may be the same as the system 600 in FIG. 6. In some embodiments, the autonomous system may be the same as the system 600 but without the training subsystem 640.

While the chart representing the drilling environment in each of FIGS. 6-7C is shown as a two-dimensional chart, it should be appreciated that the disclosed reinforcement learning techniques are not intended to be limited thereto and that these techniques may be applied to drilling scenarios involving three-dimensional drilling environments. In the drilling scenario of FIG. 7A, the drill bit observes the actual resistivity log readings for the points in front of it. In the drilling scenario of FIG. 7B, the drill bit observes the actual resistivity log readings for the points it has already passed through only. In the drilling scenario of FIG. 7C, the drill bit observes the actual resistivity log readings for the points it has already passed through and a very noisy version of the resistivity logs in front of it. This noisy front looking resistivity logs are used to model an external system that has learned to predict the formations in front of the drill bit using past observed data.

Figure 8:
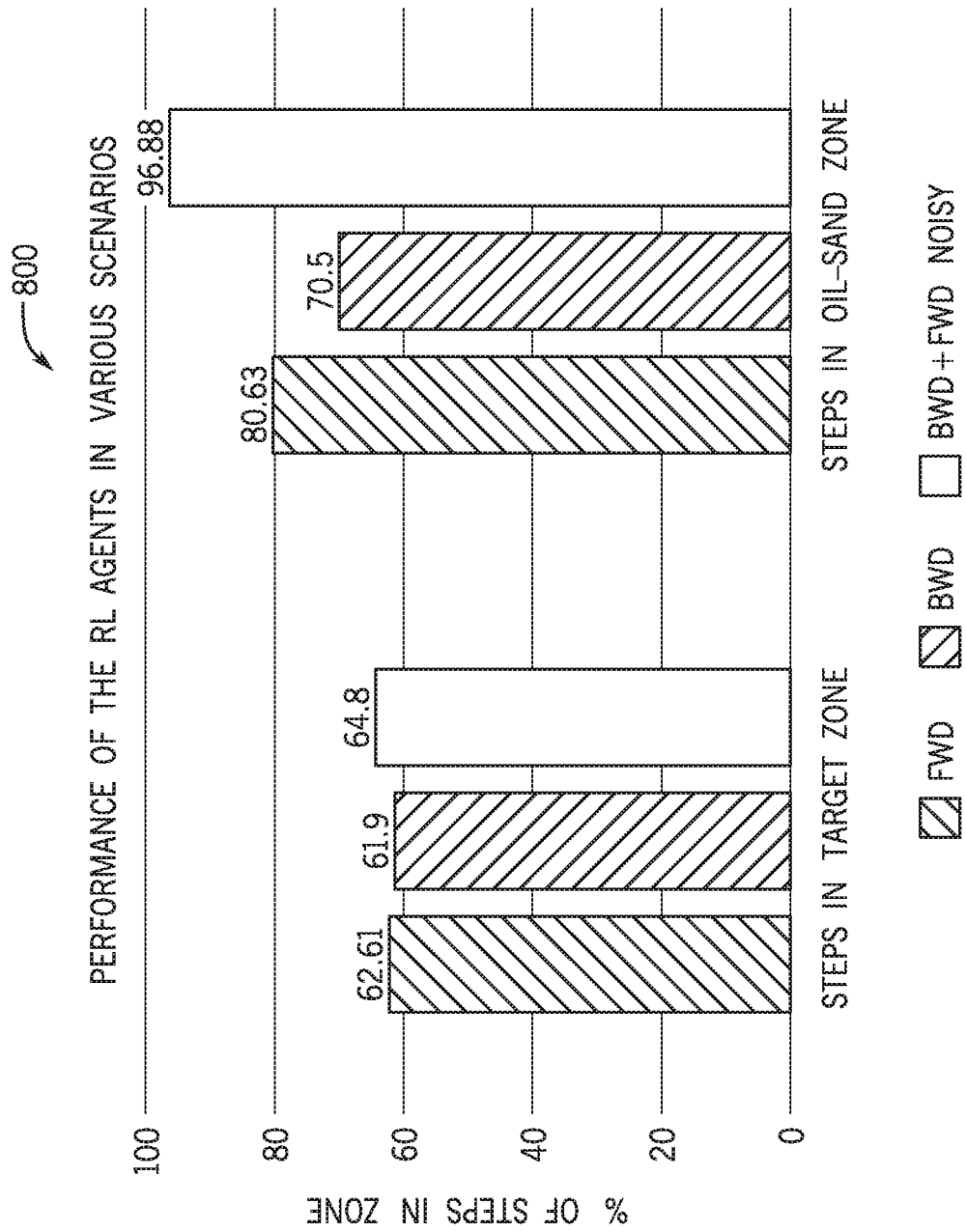
FIG. 8 is a bar graph comparing the performance of a drilling system using a reinforcement learning model trained with different types of sensor data, the system tested across multiple scenarios of new environments to provide a statistical measure of performance.

FIG. 8 is a bar graph 800 of quantitative results for comparing the performance of a drilling system using a reinforcement learning model trained or tested using different types of sensor data in each of the drilling scenarios of FIGS. 7A-7C. In particular, bar graph 800 presents two sets of quantitative results for three types of downhole sensor data used to train the model over different stages of the drilling operation. The types of sensor data in this example include preprocessed forward-looking sensor data ("FWD") (e.g., from look-ahead and/or look-around sensors at or near a distal end of a drill string within the wellbore), preprocessed backward-looking sensor data ("BWD") (e.g., from resistivity logs recorded by sensors coupled to one or more downhole segments of the drill string), and a combination of BWD sensor data and noisy FWD sensor data, e.g., as acquired from the noisy downhole environment without any preprocessing.

In FIG. 8, bar graph 800 first shows the number of drilling steps or stages in which the drill string and wellbore were located in the target zone of the formation during the drilling operation. The target zone may correspond to a reservoir of the formation targeted for hydrocarbon production. Secondly, bar graph 800 shows the number of drilling steps or stages in which the drilling string and wellbore were in a reservoir zone including a mixture of oil and sand. The results shown in FIG. 8 indicate that the drilling system with the trained reinforcement learning model was able to produce a well path that stayed within the target zone during the majority of steps/stages of the drilling operation regardless of the type of sensor data used to train the model. The results further indicate that the drilling system excelled at handling the BWD data, e.g., resistivity logs from sensors located in the back (or toward a proximal end of the drill string away from the drill bit) and noisy FWD data.

Figure 9:
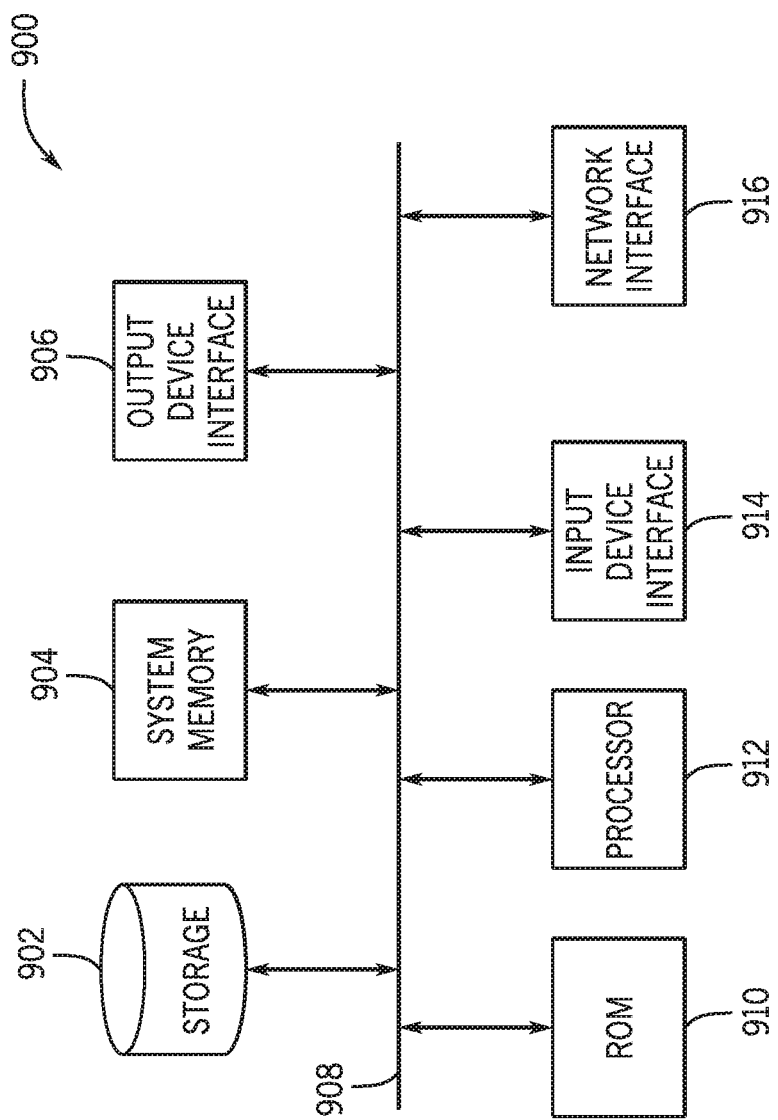
FIG. 9 is a block diagram illustrating an example of a computer system in which embodiments of the present disclosure may be implemented.

FIG. 9 is a block diagram illustrating an example of a computer system 900 in which embodiments of the present disclosure may be implemented. For example, system 300 of FIG. 3, as described above, may be implemented using system 900. System 900 can be a computer, phone, PDA, or any other type of electronic device. Such an electronic device includes various types of computer readable media and interfaces for various other types of computer readable media. As shown in FIG. 9, system 900 includes a permanent storage device 902, a system memory 904, an output device interface 906, a system communications bus 908, a read-only memory (ROM) 910, processing unit(s) 912, an input device interface 914, and a network interface 916.

Bus 908 collectively represents all system, peripheral, and chipset buses that communicatively connect the numerous internal devices of system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of system 900. Permanent storage device 902, on the other hand, is a read-and-write memory device. This device is a non-volatile memory unit that stores instructions and data even when system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random-access memory. System memory 904 stores some of the instructions and data that the processor needs at runtime. In some implementations, the processes of the subject disclosure are stored in system memory 904, permanent storage device 902, and/or ROM 910. For example, the various memory units include instructions for automated drilling optimization and control using active reinforcement learning in accordance with some implementations. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the system 900. Input devices used with input device interface 914 include, for example, alphanumeric, QWERTY, or T9 keyboards, microphones, and pointing devices (also called "cursor control devices"). Output device interfaces 906 enables, for example, the display of images generated by the system 900. Output devices used with output device interface 906 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 9, bus 908 also couples system 900 to a public or private network (not shown) or combination of networks through a network interface 916. Such a network may include, for example, a local area network ("LAN"), such as an Intranet, or a wide area network ("WAN"), such as the Internet. Any or all components of system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 400, 500 and 600 of FIGS. 4, 5 and 6, respectively, as described above, may be implemented using system 900 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

While specific details about the above embodiments have been described, the above hardware and software descriptions are intended merely as example embodiments and are not intended to limit the structure or implementation of the disclosed embodiments. For instance, although many other internal components of the system 900 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of automated drilling control and optimization, the method comprising:
    acquiring training data including values of drilling parameters for a current stage of a drilling operation being performed within a subsurface formation;
    training a reinforcement learning model to estimate values of the drilling parameters for a subsequent stage of the drilling operation to be performed, based on the acquired training data and a reward policy mapping inputs and outputs of the reinforcement learning model, wherein the reward policy maps the inputs and the outputs using an objective function that defines response values of one or more operating variables for the subsequent stage of the drilling operation based on current values of input parameters for the current stage of the drilling operation;
    performing the subsequent stage of the drilling operation based on the values of the drilling parameters estimated using the trained reinforcement learning model;
    calculating a difference between the estimated values and actual values of the drilling parameters, based on real-time data acquired as the subsequent stage of the drilling operation is performed within the subsurface formation and the reward policy associated with the reinforcement learning model;
    retraining the reinforcement learning model using an on-policy reinforcement algorithm to refine the associated reward policy for at least one additional stage of the drilling operation to be performed, wherein the on-policy reinforcement algorithm refines the associated reward policy based on the actual values of the drilling parameters from performing the subsequent stage of the drilling operation based on the values of the drilling parameters estimated using the reward policy, and on the calculated difference; and
    performing the at least one additional stage of the drilling operation using the retrained reinforcement learning model.

2. The method of claim 1, wherein the drilling parameters include one or more of the drilling operation and controllable parameters affecting the one or more operating variables during the drilling operation.

3. The method of claim 2, wherein the one or more operating variables are selected from the group consisting of: a planned path of a wellbore being drilled within the subsurface formation; a rate of penetration (ROP) of a drill string used to drill the wellbore during each stage of the drilling operation; and a hydraulic mechanical specific energy (HMSE) of the drill string.

4. The method of claim 3, wherein the controllable parameters are selected from the group consisting of: a rotational speed of a drill bit attached to the drill string; a weight-on-bit (WOB); a pumping rate of drilling fluid; a drilling direction; and an azimuth and inclination of the planned path of the wellbore being drilled.

5. The method of claim 1, wherein the values for one or more of the drilling parameters are determined based on a geophysical model of the subsurface formation.

6. The method of claim 1, wherein the reinforcement learning model is a deep-learning neural network.

7. The method of claim 6, wherein retraining comprises:
    applying Bayesian optimization to one or more hyperparameters of the deep-learning neural network.

8. A system comprising:
a processor; and
a memory coupled to the processor and having instructions stored therein, which when executed by the processor, cause the processor to perform a plurality of functions, including functions to:
    acquire training data including values of drilling parameters for a current stage of a drilling operation being performed within a subsurface formation;
    train a reinforcement learning model to estimate values of the drilling parameters for a subsequent stage of the drilling operation to be performed, based on the acquired training data and a reward policy mapping inputs and outputs of the reinforcement learning model, wherein the reward policy maps the inputs and the outputs using an objective function that defines response values of one or more operating variables for the subsequent stage of the drilling operation based on current values of input parameters for the current stage of the drilling operation;

perform the subsequent stage of the drilling operation based on the values of the drilling parameters estimated using the trained reinforcement learning model;

calculate a difference between the estimated values and actual values of the drilling parameters, based on real-time data acquired as the subsequent stage of the drilling operation is performed within the subsurface formation and the reward policy associated with the reinforcement learning model;

retrain the reinforcement learning model using an on-policy reinforcement algorithm to refine the associated reward policy for at least one additional stage of the drilling operation to be performed, wherein the on-policy reinforcement algorithm refines the associated reward policy based on the actual values of the drilling parameters from performing the subsequent stage of the drilling operation based on the values of the drilling parameters estimated using the reward policy, and on the calculated difference; and perform the at least one additional stage of the drilling operation using the retrained reinforcement learning model.

9. The system of claim 8, wherein the drilling parameters include one or more of the drilling operation and controllable parameters affecting the one or more operating variables during the drilling operation.

10. The system of claim 9, wherein the one or more operating variables are selected from the group consisting of: a planned path of a wellbore being drilled within the subsurface formation; a rate of penetration (ROP) of a drill string used to drill the wellbore during each stage of the drilling operation; and a hydraulic mechanical specific energy (HMSE) of the drill string.

11. The system of claim 10, wherein the controllable parameters are selected from the group consisting of: a rotational speed of a drill bit attached to the drill string; a weight-on-bit (WOB); a pumping rate of drilling fluid; a drilling direction; and an azimuth and inclination of the planned path of the wellbore being drilled.

12. The system of claim 8, wherein:
the values for one or more of the drilling parameters are determined based on a geophysical model of the subsurface formation; or
the reinforcement learning model is a deep-learning neural network.

13. The system of claim 12, wherein a Bayesian optimization is applied to one or more hyperparameters of the deep-learning neural network to retrain the reinforcement learning model.

14. A computer-readable storage medium having instructions stored therein, which when executed by a computer cause the computer to perform a plurality of functions, including functions to:

acquire training data including values of drilling parameters for a current stage of a drilling operation being performed within a subsurface formation;

train a reinforcement learning model to estimate values of the drilling parameters for a subsequent stage of the drilling operation to be performed, based on the acquired training data and a reward policy mapping inputs and outputs of the reinforcement learning model, wherein the reward policy maps the inputs and the outputs using an objective function that defines response values of one or more operating variables for the subsequent stage of the drilling operation based on current values of input parameters for the current stage of the drilling operation;

perform the subsequent stage of the drilling operation based on the values of the drilling parameters estimated using the trained reinforcement learning model;

calculate a difference between the estimated values and actual values of the drilling parameters, based on real-time data acquired as the subsequent stage of the drilling operation is performed within the subsurface formation and the reward policy associated with the reinforcement learning model;

retrain the reinforcement learning model using an on-policy reinforcement algorithm to refine the associated reward policy for at least one additional stage of the drilling operation to be performed, wherein the on-policy reinforcement algorithm refines the associated reward policy based on the actual values of the drilling parameters from performing the subsequent stage of the drilling operation based on the values of the drilling parameters estimated using the reward policy, and on the calculated difference; and perform the at least one additional stage of the drilling operation using the retrained reinforcement learning model.

15. The computer-readable storage medium of claim 14, wherein the drilling parameters include one or more of the drilling operation and controllable parameters affecting the one or more operating variables during the drilling operation.

16. The computer-readable storage medium of claim 15, wherein the one or more operating variables are selected from the group consisting of: a planned path of a wellbore being drilled within the subsurface formation; a rate of penetration (ROP) of a drill string used to drill the wellbore during each stage of the drilling operation; and a hydraulic mechanical specific energy (HMSE) of the drill string.

17. The computer-readable storage medium of claim 16, wherein the controllable parameters are selected from the group consisting of: a rotational speed of a drill bit attached to the drill string; a weight-on-bit (WOB); a pumping rate of drilling fluid; a drilling direction; and an azimuth and inclination of the planned path of the wellbore being drilled.

18. The computer-readable storage medium of claim 14, wherein the values for one or more of the drilling parameters are determined based on a geophysical model of the subsurface formation.

19. The computer-readable storage medium of claim 14, wherein the reinforcement learning model is a deep-learning neural network.

20. The computer-readable storage medium of claim 19, wherein a Bayesian optimization is applied to one or more hyperparameters of the deep-learning neural network to retrain the reinforcement learning model.

* * * * *